United States Patent
Chen

(10) Patent No.: US 7,719,813 B2
(45) Date of Patent: May 18, 2010

(54) GATE-COUPLED SUBSTRATE-TRIGGERED ESD PROTECTION CIRCUIT AND INTEGRATED CIRCUIT THEREWITH

(75) Inventor: Shiao-Shien Chen, Hsinchu (TW)

(73) Assignee: United Microelectronics Corp., Hsinchu (TW)

(*) Notice: Subject to any disclaimer, the term of this patent is extended or adjusted under 35 U.S.C. 154(b) by 524 days.

(21) Appl. No.: 11/163,466

(22) Filed: Oct. 20, 2005

(65) Prior Publication Data

US 2007/0091530 A1   Apr. 26, 2007

(51) Int. Cl.
H02H 9/00   (2006.01)
(52) U.S. Cl. .......................... 361/111; 361/56
(58) Field of Classification Search ................ 361/111, 361/56
See application file for complete search history.

(56) References Cited

U.S. PATENT DOCUMENTS

| | | | | |
|---|---|---|---|---|
| 5,646,808 A | * | 7/1997 | Nakayama | 361/56 |
| 6,465,768 B1 | * | 10/2002 | Ker et al. | 250/214.1 |
| 6,566,715 B1 | * | 5/2003 | Ker et al. | 257/355 |
| 6,858,901 B2 | * | 2/2005 | Ker et al. | 257/360 |
| 7,064,942 B2 | * | 6/2006 | Ker et al. | 361/56 |
| 7,106,568 B2 | * | 9/2006 | Chen | 361/91.1 |
| 2003/0223166 A1 | * | 12/2003 | Chen et al. | 361/56 |

* cited by examiner

*Primary Examiner*—Danny Nguyen
(74) *Attorney, Agent, or Firm*—Jianq Chyun IP Office

(57) ABSTRACT

An ESD protection design using a gate-coupled substrate-triggered technique is provided. A required RC time constant maintained in the gate-coupled substrate-triggered ESD circuit is based on a parasitic MOS capacitor and larger resistor, in which a layout area for the substrate-triggered ESD protection design is significantly reduced.

19 Claims, 4 Drawing Sheets

GATE-COUPLED SUBSTRATE-TRIGGERED ESD PROTECTION CIRCUIT AND INTEGRATED CIRCUIT THEREWITH

BACKGROUND OF THE INVENTION

1. Field of Invention

The present invention relates to an ESD protection circuit. More particularly, the present invention relates to a gate-coupled substrate-triggered ESD protection circuit in which a layout area therefor is significantly decreased.

2. Description of Related Art

With the continued miniaturization of integrated circuit (IC) devices, the current trend is to produce integrated circuits having shallower junction depths, thinner gate oxides, lightly-doped drain (LDD) structures, shallow trench isolation (STI) structures, and self-aligned silicide (salicide) processes, all of which are used in advanced sub-quarter-micron CMOS technologies. All of these processes make the related CMOS IC products to become more susceptible to electrostatic discharge (ESD) damage. Therefore, ESD protection circuits are built onto the chip to protect the devices and circuits of the IC against ESD damage. It is generally desired that the ESD robustness for commercial IC products be higher than 2 kV in human-body-model (HBM) ESD stress. To sustain ESD overstress, devices with large dimensions need to be designed into the on-chip ESD protection circuit, and require a large total layout area on the silicon substrate. Typically, an NMOS in an I/O ESD protection circuit has a total channel width that is greater than 300 μm. With such large device dimensions, the NMOS is often realized with multiple fingers in the layout. However, under an ESD stress, the multiple fingers of ESD protection NMOS do not uniformly turn on to bypass the ESD current. Only a portion of the fingers of the NMOS may be turned on, and consequently leading to damage from the ESD pulse. In this case, although the ESD protection NMOS has a very large device dimension, the ESD protection level is low. In order to improve the turn-on uniformity, a gate-driven design has been used to increase the ESD protection level of the large-device-dimension ESD protection NMOS. However, it has been found that the ESD protection level of the gate-driven NMOS decreases dramatically when the gate voltage is somewhat increased. The gate-driven design pulls ESD current flowing through the channel surface of the NMOS rather than the bulk. The NMOS is thus more easily burnt-out by the ESD energy. Please refer to FIG. 1, which shows a schematic circuit diagram of prior art ESD protection design 100 using a substrate-triggered technique. As shown in FIG. 1, the ESD protection circuit design 100 includes an NMOS 102, an internal circuit 104, a pad 106, a substrate-biasing circuit 108, and a conductor for electrically connecting the internal circuit 104 with the pad 106. The NMOS 102 further includes a source 112, a drain 114 electrically connected to the pad 106, a gate 116, and a substrate 118 biased by the substrate-biasing circuit 108. When a positive ESD voltage zaps the pad 106, the bulk (substrate) of the ESD protection NMOS 102 is biased at some voltage level generated by the substrate-biasing circuit 108. With the substrate-biasing voltage, parasitic lateral n-p-n bipolar junction transistor (BJT) 120 effects in the NMOS 102 are triggered on to discharge the ESD current. In this substrate-triggered technique, the ESD current flowing through the NMOS 102 is far from the channel surface.

The substrate-triggered effect turns on a parasitic lateral n-p-n BJT 120 of the NMOS 102 structure to pull the current to flow through the bulk of the NMOS 102, which is far from the surface channel of the NMOS, and so avoids the drain LDD edge structure. The bulk of the NMOS 102 has a larger volume to dissipate ESD-generated heat. The substrate-triggered NMOS 102 can thus sustain a much higher ESD level within the same silicon area. The substrate-triggered technique has consequently become more important in sub-quarter-micron CMOS processes for effective on-chip substrate-triggered ESD protection.

Another ESD protection design 100 using a substrate-triggered technique is proposed in the U.S. Pat. No. 6,465,768, entitled "MOS STRUCTURE WITH IMPROVED SUBSTRATE-TRIGGERED EFFECT FOR ON-CHIP ESD PROTECTION", assigned to Ker et al., which is owned by the same assignee as the present application. Please refer to FIG. 2, which is a schematic circuit diagram of an output ESD protection circuit 200. The output ESD protection circuit 200 is realized by the substrate-triggered technique with the PMOS and NMOS device structure. As shown in FIG. 2, when a positive-to-$V_{SS}$ ESD zapping event occurs on the output pad 210, the $V_{SS}$ power terminal is grounded and the $V_{DD}$ power terminal is floated. The sharply-rising ESD voltage pulse is connected through a capacitor 202 to a gate 206 of NMOS 204. This connected voltage is maintained on the gate 206 of the NMOS 204 for a longer period of time by a resistor 208.

With a connected voltage greater than the threshold voltage (VTH) of the NMOS 204, the NMOS 204 is turned on and conducts some of the ESD current from the pad 210 through the ESD protection NMOS 212. With a trigger current generated from the NMOS 204, the ESD protection NMOS 212 is turned on more quickly to discharge the ESD current from the pad 210 to the $V_{SS}$ power terminal. The substrate-triggered current generated from the NMOS 204 triggers on the parasitic lateral n-p-n BJT 214 of the ESD protection NMOS 212 to pull the current to flow through the substrate (bulk) of the ESD protection NMOS 212, which is far from the surface channel of the ESD protection NMOS 212. The bulk of the ESD protection NMOS 212 has a larger volume to dissipate ESD-generated heat, and therefore the substrate-triggered ESD protection NMOS 212 can sustain a much higher ESD protection level.

With a negative-to-$V_{DD}$ ESD zapping on the output pad 210, the $V_{DD}$ power terminal is grounded and the $V_{SS}$ power terminal is floated. The sharply-falling negative ESD voltage pulse is connected through the capacitor 222 to the gate 226 of the PMOS 224. This connected voltage is maintained on the gate 226 of the PMOS 224 for a longer period of time by resistor 228. With a connected negative gate voltage, the PMOS 224 is turned on and conducts some negative ESD current from the pad 210 through the ESD protection PMOS 232. With a trigger current generated from the PMOS 224, the ESD protection PMOS 232 is turned on more quickly to discharge the negative ESD current from the pad 210 to the $V_{DD}$ power terminal. The substrate-triggered current generated from the PMOS 224 triggers on the parasitic lateral p-n-p BJT 234 of the ESD protection PMOS 232 to pull the current to flow through the N-type well (bulk) of the ESD protection PMOS 232, which is far from the surface channel of the ESD protection PMOS 232. The bulk of the ESD protection PMOS 232 has a larger volume to dissipate ESD-generated heat, and therefore the substrate-triggered ESD protection PMOS 232 can sustain a much higher ESD protection level.

However, in these proposed ESD protection design using a substrate-triggered technique, a RC time constant will consume a larger of layout area. The power clamp layout of the ESD protection design will also consume a large of layout area.

SUMMARY OF THE INVENTION

Accordingly, the present invention is directed to provide a gate-coupled substrate-triggered ESD protection design. A required RC time constant maintained in the substrate-triggered ESD circuit is based on a parasitic MOS capacitor and larger resistor, in which a layout area for the substrate-triggered ESD protection design is significantly reduced.

In one embodiment, a substrate-triggered ESD protection circuit is provided. The ESD protection circuit comprising a first resistor, a second resistor, a first transistor and a second transistor. A gate terminal of the first transistor is connected to a power terminal through a first drain-to-gate capacitance, a drain terminal of the first transistor is connected to the substrate and pad. A bulk terminal of the first transistor is connected to ground. connectedconnectedconnected. A gate terminal of the second transistor is connectedconnected to the gate terminal of the first transistor and also connected to the power terminal through a second drain-to-gate capacitance, a drain terminal of the second transistor is connected to the pad and a source terminal of the second transistor is connected to the power terminal, a bulk terminal of the second transistor is connected to the source terminal of the first transistorconnected. When an ESD voltage zaps the pad, a RC constant is maintained base on the first resistor, a first parasitic capacitor between the gate terminal and the drain terminal of the first transistor and a second parasitic capacitor between the gate terminal and the drain terminal of the second transistor for the substrate-triggered effect of the ESD protection circuit.

In the above embodiment, when the ESD voltage zaps the pad, the bulk terminal of the second transistor is biased at a substrate-biasing voltage generated by the second resistor, with the substrate-biasing voltage, a parasitic lateral bipolar junction transistor effecting in the second transistor are triggered on to discharge an ESD current to the power terminal.

In an alternative embodiment, the first transistor and the second transistor are N-type Metal-Oxide-Semiconductor (NMOS) transistors. The power terminal is grounded.

In an alternative embodiment, the first transistor and the second transistor are P-type Metal-Oxide-Semiconductor (PMOS) transistors. The voltage level of the power terminal is the voltage level of an operation voltage.

In one embodiment, a substrate-triggered ESD protection circuit is provided. The ESD protection circuit comprising a first resistor, a second resistor, a first transistor and a second transistor. A gate terminal of the first transistor is connected to a power terminal through the first drain-to-gate capacitance. source/drain terminals of the first transistor are respectively connected to a pad and to the second resistor. The gate terminal of the first transistor is connected to the first resistor. A gate terminal of the second transistor is connected to the ground, source/drain terminals of the second transistor are respectively connected to the pad and to the ground, a bulk terminal of the second transistor is connected to the sourceterminal of the first transistor and is also connected to the ground through the second resistor. When an ESD voltage zaps the pad, a RC constant is maintained base on the first resistor and a first parasitic capacitor between the gate terminal and the drain terminal of the first transistor for the substrate-triggered effect of the ESD protection circuit.

In one embodiment, a substrate-triggered ESD protection circuit is provided. The ESD protection circuit includes a first resistor, a second resistor, a CMOS element and a second NMOS transistor. The CMOS element comprises a first NMOS transistor and a first PMOS transistor. A gate terminal of the first NMOS transistor is connected to a pad through the first resistor; a drain terminal of the first NMOS transistor is connected to the drain terminal of the first PMOS transistor and also connected to ground through a second resistor. A gate terminal of the first PMOS transistor is connected to the pad through the first resistor, and a source terminal of the first PMOS transistor is connected to the pad. In the second NMOS transistor, a gate terminal of the second NMOS transistor is connected to the gate terminal of the first NMOS transistor and is connected to the pad through the first resistor, a drain terminal of the second NMOS transistor is connected to the pad, and the source terminal of the second NMOS transistor is connected to ground. When an ESD voltage zaps the pad, a RC constant is maintained base on the first resistor, a first parasitic capacitor between the gate terminal and the source terminal of the first NMOS transistor and a second parasitic capacitor between the gate terminal and the source terminal of the second NMOS transistor for the substrate-triggered effect of the ESD protection circuit.

In one embodiment, a substrate-triggered ESD protection circuit comprises a first resistor, a second resistor, a CMOS element and a second NMOS transistor. The CMOS element includes a first NMOS transistor and a first PMOS transistor. A gate terminal of the first NMOS transistor is connected to a pad through the first resistor, a drain terminal of the first NMOS transistor is connected to the drain terminal of the first PMOS transistor and also connected to a ground through a second resistor. A gate terminal of the first PMOS transistor is connected to the pad through the first resistor, and a source terminal of the first PMOS transistor is connected to the pad. In the second NMOS transistor, a gate terminal of the second NMOS transistor is connected to the ground, a drain terminal of the second NMOS transistor is connected to the pad, and the source terminal of the second NMOS transistor is connected to the ground. When an ESD voltage zaps the pad, a RC constant is maintained base on the first resistor, a first parasitic capacitor between the gate terminal and the source terminal of the first NMOS transistor for the substrate-triggered effect of the ESD protection circuit.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention proposes an ESD protection design using a gate-coupled technique, which will not consume a larger of layout area for maintaining a RC constant in the substrate-triggered ESD circuit.

Figure 1:
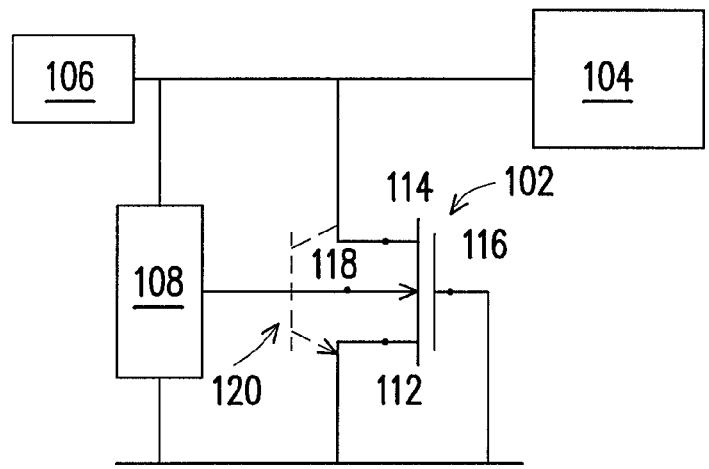
FIG. 1 shows a schematic circuit diagram of a conventional ESD protection design using a substrate-triggered technique.
Figure 2:
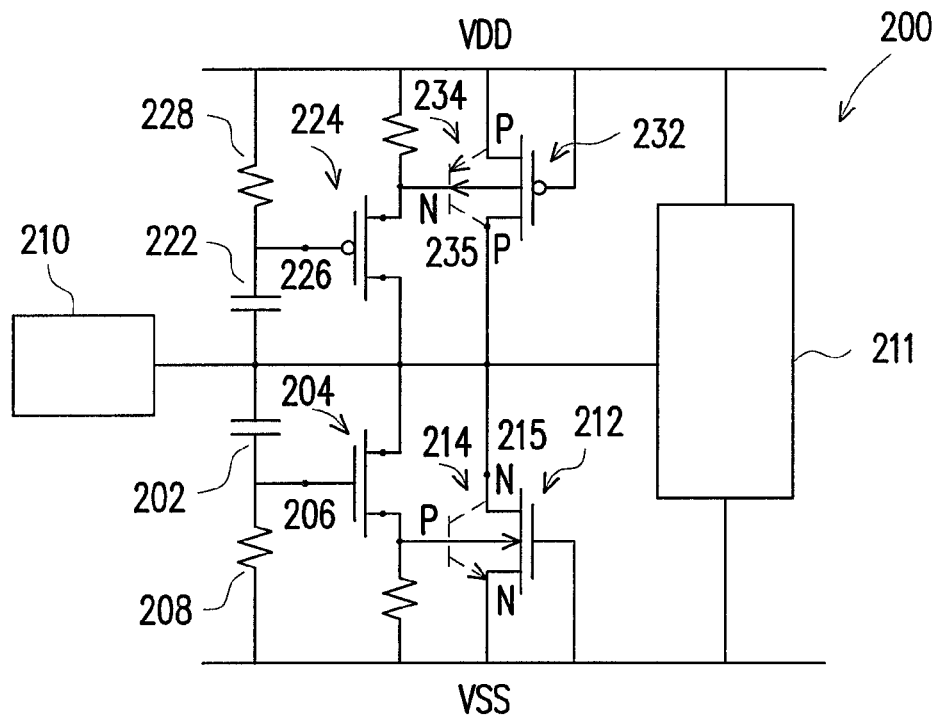
FIG. 2 shows a schematic circuit diagram of a conventional output ESD protection circuit.
Figure 3:
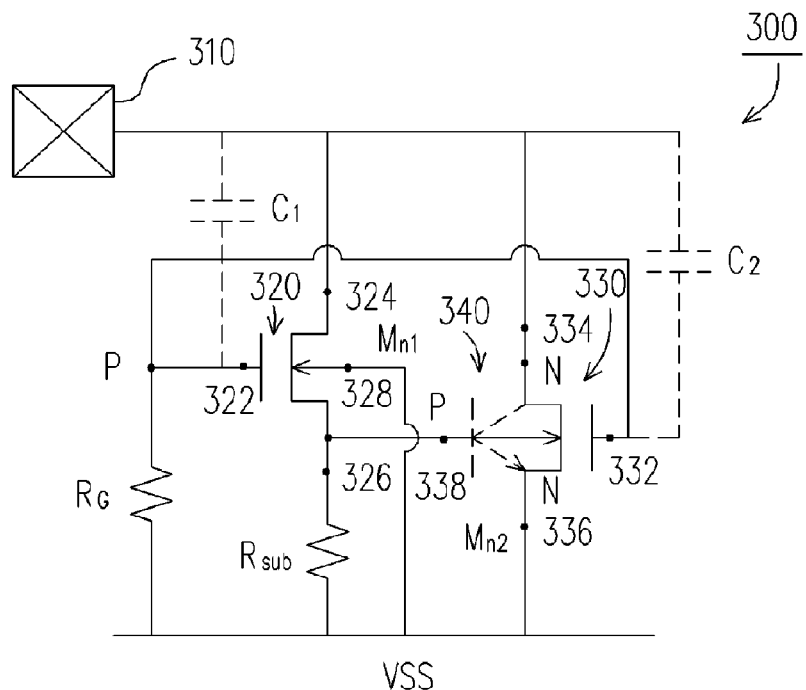
FIG. 3 shows a schematic diagram of an ESD protection circuit of an embodiment of the invention.

Please refer to FIG. 3, which shows a schematic diagram of an embodiment of an ESD protection circuit 300, which connects to a pad 310. The ESD protection circuit 300 includes a first NMOS transistor 320 (which is denoted as "Mn1") and a second NMOS transistor 330 (which is denoted as "Mn2"). The gate terminal 322 of the NMOS transistor 320 is connected to a $V_{SS}$ power terminal through a resistor RG, the drain terminal 324 of the NMOS transistor 320 is connected to the pad 310 and the source terminal 326 of the NMOS transistor 320 is connected to the $V_{SS}$ power terminal through a resistor $R_{sub}$. The bulk (substrate) of the NMOS transistor 320 is connected to the $V_{SS}$ power terminal.

The gate terminal 332 of the NMOS transistor 330 is connected to the gate terminal 322 of the NMOS transistor 320, the drain terminal 334 of the NMOS transistor 330 is connected to the pad 310 and the source terminal 336 of the NMOS transistor 330 is connected to the $V_{SS}$ power terminal. The bulk terminal (substrate) 338 of the NMOS transistor 330 is connected to the source terminal 326 of the NMOS transistor 320. When a positive ESD voltage zaps the pad 310, the bulk terminal 338 is biased at some voltage level generated by a substrate-biasing voltage generated by the resistor $R_{sub}$. With the substrate-biasing voltage, parasitic lateral n-p-n bipolar junction transistor (BJT) 340 effects in the NMOS 330 are triggered on to discharge the ESD current. In this substrate-triggered technique, the ESD current flowing through the NMOS 330 is far from the channel surface.

Because in the conventional ESD protection design using a substrate-triggered technique, maintaining a RC time constant will consume a larger layout area. For improvement, the capacitor for the RC time constant is replaced with a parasitic capacitor C1 generated between the gate terminal 322 and the drain terminal 324 of the NMOS transistor 320. In the embodiment, the gate terminal 332 of the NMOS transistor 330 is connected to the gate terminal 322 of the NMOS transistor 320, which also provides a parasitic capacitor C2 between the gate terminal 332 and the drain terminal 334 of the NMOS transistor 330. By such gate-coupled design, the larger layout area for maintaining the required RC time constant is not necessary, instead, only the resistor $R_G$ is required.

Figure 4:
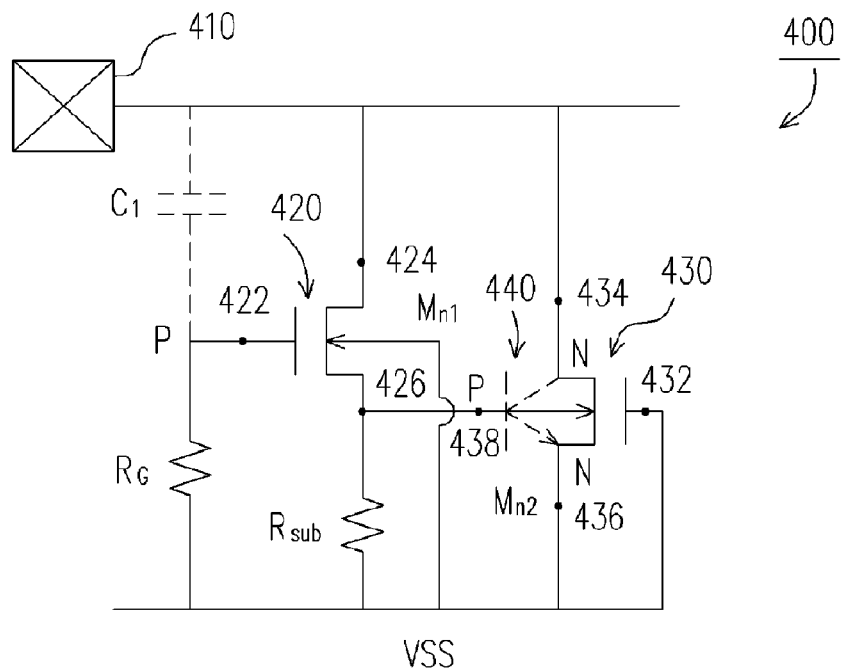
FIG. 4 shows a schematic diagram of an ESD protection circuit of an alternative embodiment of the invention.

In another alternative embodiment, please refer to FIG. 4, which shows a schematic diagram of another embodiment of an ESD protection circuit 400, which connects to a pad 410. The ESD protection circuit 400 is similar with the ESD protection circuit 300 of FIG. 3, except that the gate terminal 432 of the NMOS transistor 430 is connected to the $V_{SS}$ power terminal, instead of connecting to the gate terminal 422 of the NMOS transistor 420. The capacitor for the RC time constant is replaced with a parasitic capacitor C1 generated between the gate terminal 422 and the drain terminal 424 of the NMOS transistor 420. By such gate-coupled design, the larger layout area for maintaining the required RC time constant is not necessary, instead, only the resistor $R_G$ is required.

Figure 5:
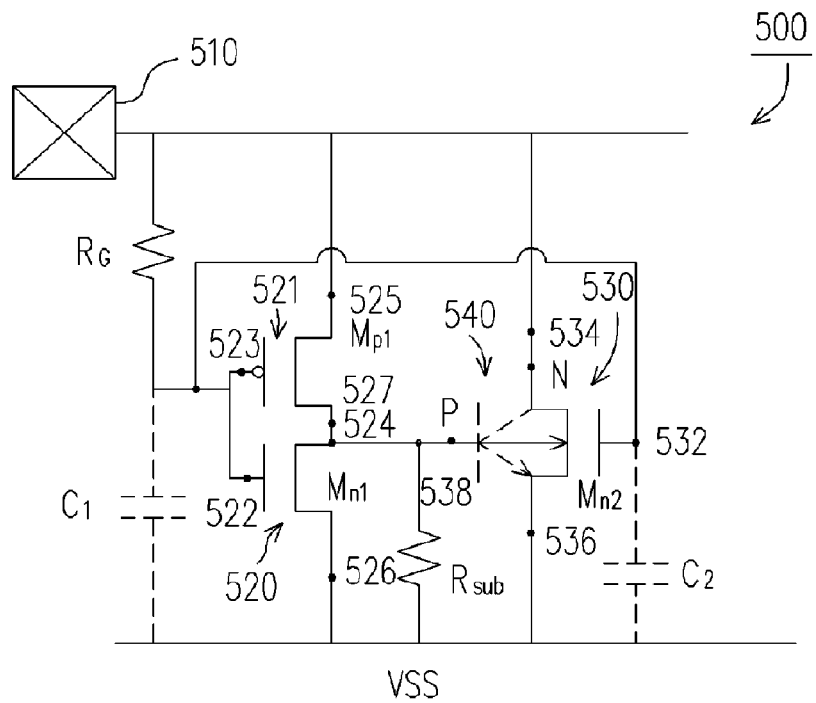
FIG. 5 shows a schematic diagram of an ESD protection circuit of an alternative embodiment of the invention.

Please refer to FIG. 5, which shows a schematic diagram of an alternative embodiment of an ESD protection circuit of the present invention. The ESD protection circuit 500 includes a complementary metal oxide semiconductor (CMOS) element comprising a first NMOS transistor 520 (which is denoted as "Mn1") and a PMOS transistor 521 (which is denoted as "Mp1"), and a second NMOS transistor 530 (which is denoted as "Mn2"). The gate terminal 522 of the NMOS transistor 520 is connected to a pad 510 through a resistor RG, the drain terminal 524 of the NMOS transistor 520 is connected to the drain terminal 527 of the PMOS transistor 521 and also connected to the $V_{SS}$ power terminal through a resistor $R_{sub}$. The gate terminal 523 of the PMOS transistor 521 is connected to the pad 510 through a resistor $R_G$, and the drain terminal of the PMOS transistor 521 is connected to the pad 510.

The gate terminal 532 of the NMOS transistor 530 is connected to the gate terminal 522 of the NMOS transistor 520 and the gate terminal 523 of the NMOS transistor 521. The drain terminal 534 of the NMOS transistor 530 is connected to the pad 510 and the source terminal 536 of the NMOS transistor 530 is connected to the $V_{SS}$ power terminal. The bulk terminal (substrate) 538 of the NMOS transistor 530 is connected to a connection between the NMOS transistor 520 and the PMOS 521.

When a positive ESD voltage zaps the pad 510, the PMOS transistor 521 is turned on and the NMOS transistor 520 is turned off. A substrate-biasing voltage is generated by the resistor $R_{sub}$. The bulk terminal 538 is biased by the voltage level of the substrate-biasing voltage. With the substrate-biasing voltage, parasitic lateral n-p-n bipolar junction transistor (BJT) 540 effecting in the NMOS 530 are triggered on to discharge the ESD current. In this substrate-triggered technique, the ESD current flowing through the NMOS 530 is far from the channel surface.

Because in the conventional ESD protection design using a substrate-triggered technique, maintaining a RC time constant will consume a larger layout area. For improvement, the capacitor for the RC time constant is replaced with a parasitic capacitor C1 generated between the gate terminal 522 and the source terminal 526 of the NMOS transistor 520. In the embodiment, the gate terminal 532 of the NMOS transistor 530 is connected to the gate terminal 522 of the NMOS transistor 520, which also provides a parasitic capacitor C2 between the gate terminal 532 and the source terminal 536 of the NMOS transistor 530. By such gate-coupled design, the larger layout area for maintaining the required RC time constant is not necessary, instead, only the resistor $R_G$ is required.

Figure 6:
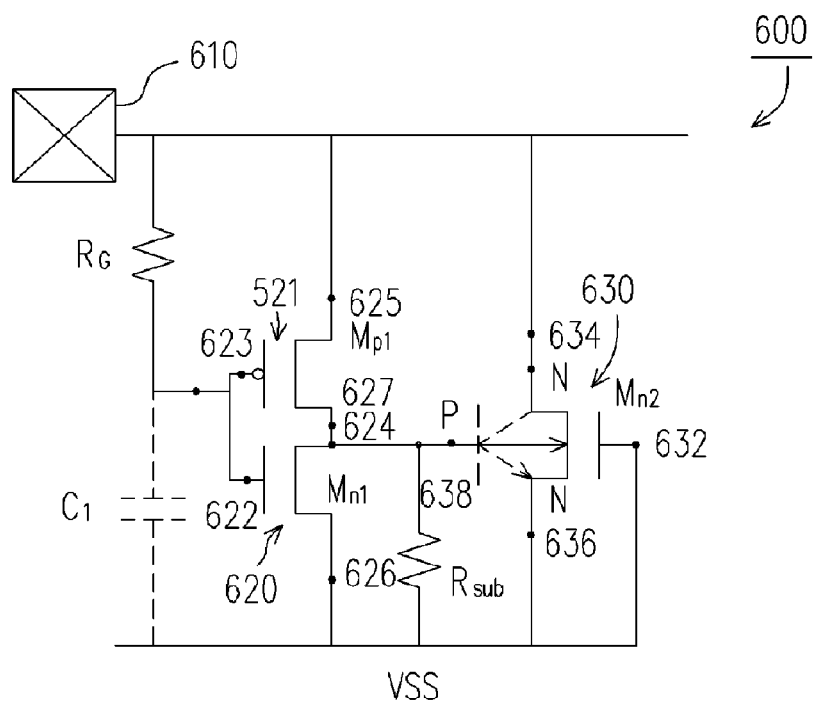
FIG. 6 shows a schematic diagram of an ESD protection circuit of an alternative embodiment of the invention.

In another alternative embodiment, please refer to FIG. 6, which shows a schematic diagram of another embodiment of an ESD protection circuit 600. The ESD protection circuit 600 is similar with the ESD protection circuit 500 of FIG. 5, except that the gate terminal 532 of the NMOS transistor 530 is connected to the $V_{SS}$ power terminal, instead of connecting to the gate terminal 622 of the NMOS transistor 620. The capacitor for the RC time constant is replaced with a parasitic capacitor C1 generated between the gate terminal 622 and the source terminal 626 of the NMOS transistor 620. By such gate-coupled design, the larger layout area for maintaining the required RC time constant is not necessary, instead, only the resistor $R_G$ is required.

Figure 7:
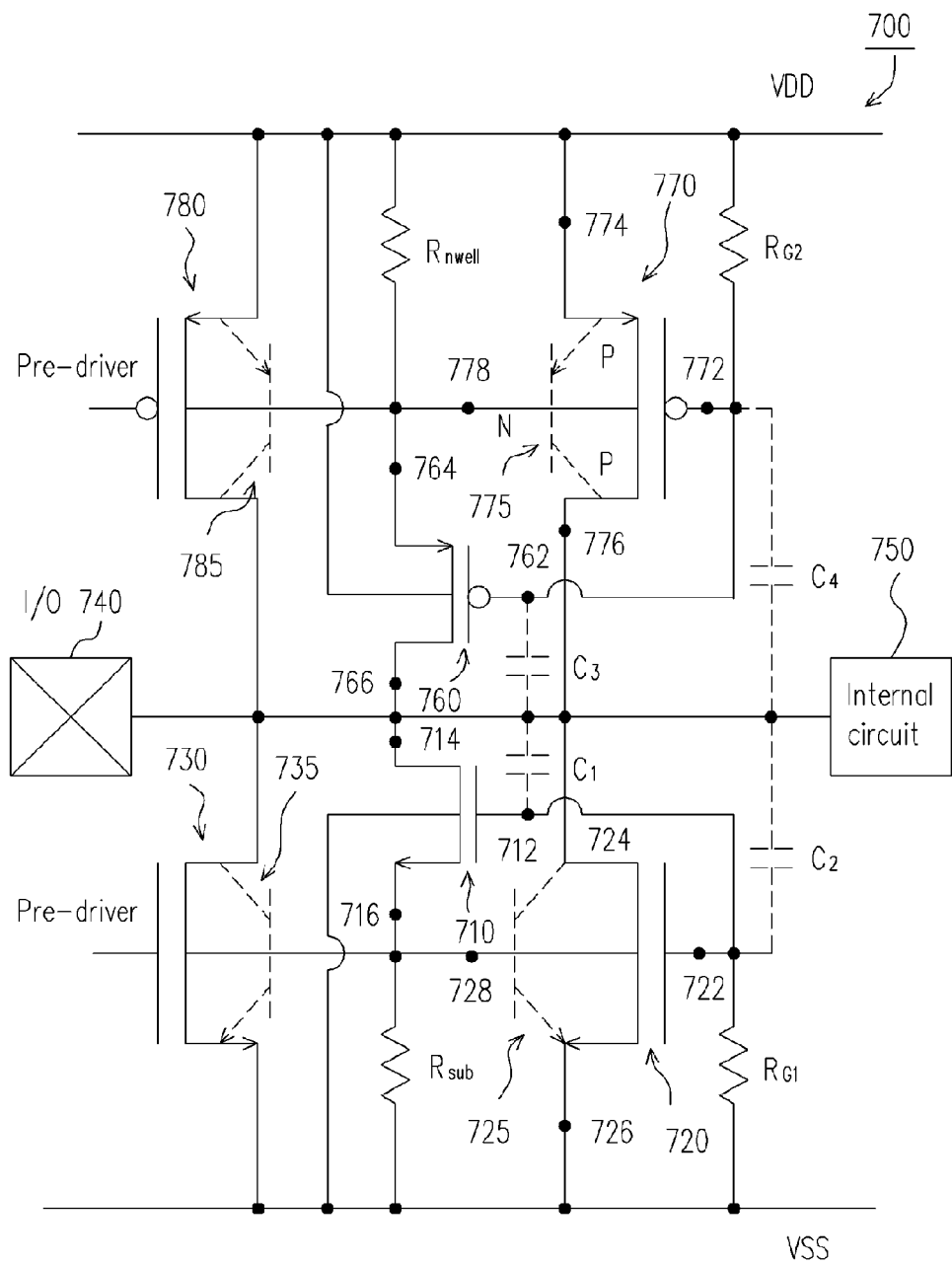
FIG. 7 shows a schematic diagram of an integrated circuit with an ESD protection circuit of one of the embodiments of the invention.

The ESD protection circuit proposed in the invention can be implemented in an integrated circuit 700 with an ESD protection circuit, a pre-driver circuit including a NMOS transistor 730 and a PMOS transistor 780, an input/output (I/O) pad 740 and an internal circuit 750, as shown in FIG. 7. In the integrated circuit 700, the ESD protection circuit includes an ESD-Voltage-to-$V_{DD}$ portion and an ESD-voltage-to-$V_{SS}$ portion. The ESD-Voltage-to-$V_{DD}$ portion is used for zapping the ESD Voltage to the voltage level of an operation voltage $V_{DD}$ of the integrated circuit 700 at the $V_{DD}$ power terminal. The ESD-Voltage-to-$V_{SS}$ portion is used for zapping the ESD Voltage to the voltage level of a grounded voltage $V_{SS}$ of the integrated circuit 700 at the $V_{SS}$ power terminal. The ground voltage $V_{SS}$ of the integrated circuit 700 can be zero volt or other voltage level defined as desired.

The ESD-Voltage-to-$V_{SS}$ portion can be one of these embodiments disclosed above in FIG. 3, FIG. 4, FIG. 5 or FIG. 6, or other embodiments with the idea of replacing the capacitor of a substrate-triggered ESD circuit with the parasitic MOS capacitor in the RC circuit. For explanation, the circuit disclosed in the FIG. 3 is incorporated herewith for example. The ESD-Voltage-to-$V_{SS}$ portion includes a first NMOS transistor 710, a second NMOS transistor 730. The gate terminal 712 of the NMOS transistor 710 is connected to a $V_{SS}$ power terminal through a resistor $R_{G1}$, the drain terminal 714 of the NMOS transistor 710 is connected to the pad 740 and the source terminal 716 of the NMOS transistor 710 is connected to the $V_{SS}$ power terminal through a resistor $R_{sub}$. The bulk (substrate) of the NMOS transistor 710 is connected to the $V_{SS}$ power terminal.

The gate terminal 722 of the NMOS transistor 720 is connected to the gate terminal 712 of the NMOS transistor 710, and is also is connected to the $V_{SS}$ power terminal through the resistor RG1. The drain terminal 724 of the NMOS transistor 720 is connected to the pad 740 and the source terminal 726 of the NMOS transistor 720 is connected to the $V_{SS}$ power terminal. The bulk terminal (substrate) 728 of the NMOS transistor 720 is connected to the source terminal 726 of the NMOS transistor 720. When an ESD-voltage-to-$V_{SS}$ event occurs, the bulk terminal 728 is biased at some voltage level by a substrate-biasing voltage generated by the resistor $R_{sub}$. With the substrate-biasing voltage, parasitic lateral n-p-n bipolar junction transistor (BJT) 725 effecting in the NMOS transistor 720 are triggered on to discharge the ESD current. In this substrate-triggered technique, the ESD current flowing through the NMOS transistor 720 is far from the channel surface. By such gate-coupled design, the larger layout area for maintaining the required RC time constant in the substrate-triggered ESD circuit is not necessary, instead, only the resistor RG1 is required.

The ESD-Voltage-to-$V_{DD}$ portion includes a first PMOS transistor 760, a second PMOS transistor 770. The gate terminal 762 of the PMOS transistor 760 is connected to the $V_{DD}$ power terminal through a resistor RG2, the source terminal 764 of the PMOS transistor 760 is connected to the $V_{DD}$ power terminal through a resistor $R_{nwell}$ and the drain terminal 766 of the PMOS transistor 760 is connected to the pad 740. The well of the PMOS transistor 760 is connected to the $V_{DD}$ power terminal.

The gate terminal 772 of the PMOS transistor 770 is connected to the gate terminal 762 of the PMOS transistor 760, and is also is connected to the $V_{DD}$ power terminal through the resistor RG2. The drain terminal 776 of the PMOS transistor 770 is connected to the pad 740 and the source terminal 774 of the PMOS transistor 770 is connected to the $V_{DD}$ power terminal. The well 778 of the PMOS transistor 770 is connected to the source terminal 764 of the PMOS transistor 760. When an ESD-voltage-to-$V_{DD}$ event occurs, the well terminal 778 is biased at some voltage level by a well-biasing voltage generated by the well resistor $R_{nwell}$. With the well-biasing voltage, parasitic lateral p-n-p bipolar junction transistor (BJT) 775 effecting in the PMOS 770 are triggered on to discharge the ESD current. In this substrate-triggered technique, the ESD current flowing through the PMOS 770 is far from the channel surface. By such gate-coupled design, the larger layout area for maintaining the required RC time constant in the substrate-triggered ESD circuit is not necessary, instead, only the resistor $R_{G2}$ is required.

The invention provides an ESD protection design using a gate-coupled technique, in which larger layout area for maintaining a required RC time constant in the substrate-triggered ESD circuit is not necessary, instead, making use of the parasitic MOS capacitor and larger resistor $R_G$, capacitor C in the conventional substrate-triggered can be removed. Therefore, the layout area is significantly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A substrate-triggered ESD protection circuit, comprising:
    a first resistor;
    a first transistor, wherein a gate terminal of the first transistor is connected to a power terminal through the first resistor, a source terminal of the first transistor is connected to the power terminal through a second resistor, a drain terminal of the first transistor is connected to a pad, and a bulk terminal of the first transistor is connected to the power terminal directly or through the second resistor, the first transistor is configured for being served as a substrate-biasing circuit without a capacitor formed between the gate terminal and the drain terminal thereof; and
    a second transistor, wherein a gate terminal of the second transistor is connected to the gate terminal of the first transistor and also connected to the power terminal through the first resistor, source/drain terminals of the second transistor are respectively connected to the power terminal and the pad, a bulk terminal of the second transistor is connected to the source terminal of the first transistor and is also connected to the power terminal through the second resistor, the second transistor is configured for being served as an ESD protection element;
    when a ESD voltage zaps the pad, a RC constant is maintained based on the first resistor, a first parasitic capacitor between the gate terminal and the drain terminal of the first transistor and a second parasitic capacitor between the gate terminal and the drain terminal of the second transistor for the substrate-triggered effect of the ESD protection circuit.

2. The substrate-triggered ESD protection circuit as claimed in claim 1, wherein when the ESD voltage zaps the pad, the bulk terminal of the second transistor is biased at a substrate-biasing voltage generated by the second resistor, with the substrate-biasing voltage, a parasitic lateral bipolar junction transistor effecting in the second transistor are triggered on to discharge an ESD current to the power terminal.

3. The substrate-triggered ESD protection circuit as claimed in claim 1, wherein the first transistor and the second transistor are N-type Metal-Oxide-Semiconductor (NMOS) transistors.

4. The substrate-triggered ESD protection circuit as claimed in claim 3, wherein the power terminal is grounded.

5. The substrate-triggered ESD protection circuit as claimed in claim 1, wherein the first transistor and the second transistor are P-type Metal-Oxide-Semiconductor (PMOS) transistors.

6. The substrate-triggered ESD protection circuit as claimed in claim 5, wherein the voltage level of the power terminal is the voltage level of an operation voltage.

7. A substrate-triggered ESD protection circuit, comprising:
- a first resistor;
- a first transistor, wherein a gate terminal of the first transistor is connected to a power terminal through the first resistor, a source terminal of the first transistor is connected to the power terminal through a second resistor, a drain terminal of the first transistor is connected to a pad, and a bulk terminal of the first transistor is connected to the power terminal directly or through the second resistor, the first transistor is configured for being served as a substrate-biasing circuit without a capacitor formed between the gate terminal and the drain terminal thereof; and
- a second transistor, wherein a gate terminal of the second transistor is connected to the power terminal, source/drain terminals of the second transistor are respectively connected to the power terminal and the pad, a bulk terminal of the second transistor is connected to the source terminal of the first transistor and is also connected to the power terminal through the second resistor, the second transistor is configured for being served as an ESD protection element;
- when a ESD voltage zaps the pad, a RC constant is maintained based on the first resistor and a first parasitic capacitor between the gate terminal and the drain terminal of the first transistor for the substrate-triggered effect of the ESD protection circuit.

8. The substrate-triggered ESD protection circuit as claimed in claim 7, wherein when the ESD voltage zaps the pad, the bulk terminal of the second transistor is biased at a substrate-biasing voltage generated by the second resistor, with the substrate-biasing voltage, a parasitic lateral bipolar junction transistor effecting in the second transistor are triggered on to discharge an ESD current to the power terminal.

9. The substrate-triggered ESD protection circuit as claimed in claim 7, wherein the first transistor and the second transistor are N-type Metal-Oxide-Semiconductor (NMOS) transistors.

10. The substrate-triggered ESD protection circuit as claimed in claim 9, wherein the power terminal is grounded.

11. The substrate-triggered ESD protection circuit as claimed in claim 7, wherein the first transistor and the second transistor are P-type Metal-Oxide-Semiconductor (PMOS) transistors.

12. The substrate-triggered ESD protection circuit as claimed in claim 11, wherein the voltage level of the power terminal is the voltage level of an operation voltage.

13. A substrate-triggered ESD protection circuit, comprising:
- a first resistor;
- a complementary metal oxide semiconductor (CMOS) element, comprising a first NMOS transistor and a first PMOS transistor, wherein
  - a gate terminal of the first NMOS transistor is connected to a pad through the first resistor, a drain terminal of the first NMOS transistor is connected to the drain terminal of the first PMOS transistor and also connected to a power terminal through a second resistor; and
  - a gate terminal of the first PMOS transistor is connected to the pad through the first resistor, and a source terminal of the first PMOS transistor is connected to the pad;
  - wherein the complementary metal oxide semiconductor is configured for being served as a substrate-biasing circuit; and
- a second NMOS transistor, wherein a gate terminal of the second NMOS transistor is connected to the gate terminal of the first NMOS transistor and is connected to the pad through the first resistor, a drain terminal of the second NMOS transistor is connected to the pad, and the source terminal of the second NMOS transistor is connected to the power terminal, the second transistor is configured for being served as an ESD protection element, wherein
- when an ESD voltage zaps the pad, a RC constant is maintained based on the first resistor, a first parasitic capacitor between the gate terminal and the drain terminal of the first NMOS transistor and a second parasitic capacitor between the gate terminal and the drain terminal of the second NMOS transistor for the substrate-triggered effect of the ESD protection circuit.

14. The substrate-triggered ESD protection circuit as claimed in claim 13, wherein when the ESD voltage zaps the pad, the bulk terminal of the second transistor is biased at a substrate-biasing voltage generated by the second resistor, with the substrate-biasing voltage, a parasitic lateral bipolar junction transistor effecting in the second transistor are triggered on to discharge an ESD current to the power terminal.

15. The substrate-triggered ESD protection circuit as claimed in claim 13, wherein the power terminal is grounded.

16. An integrated circuit with an substrate-triggered ESD protection circuit interposed between an input/output (I/O) pad and an internal circuit, a pre-driver circuit interposed between the I/O pad and the substrate-triggered ESD protection circuit, wherein the substrate-triggered ESD protection circuit comprising a first ESD portion, wherein the first ESD portion is used to discharge an ESD current to a ground power terminal, wherein
- the first ESD portion comprising a first resistor, a second resistor, a first NMOS transistor and a second NMOS transistor, wherein
- a gate terminal of the first NMOS transistor is connected to the ground power terminal through the first resistor, a drain terminal of the first NMOS transistor is connected to the pad and the source terminal of the first NMOS transistor is connected to the ground power terminal through the second resistor, a bulk terminal of the first NMOS transistor is connected to the ground power terminal, the first NMOS is configured for being served as a substrate-biasing circuit without a capacitor formed between the gate terminal and the drain terminal thereof;
- a gate terminal of the second NMOS transistor is connected to the gate terminal of the first NMOS transistor, and is also connected to the ground power terminal through the first resistor, a drain terminal of the second NMOS transistor is connected to the pad and the source terminal of the second NMOS transistor is connected to the ground power terminal, a bulk terminal of the second NMOS transistor is connected to the source terminal of the second NMOS transistor and is connected to the ground power terminal through the second resistor, the second NMOS is configured for being served as an ESD protection element;
- when a ESD voltage zaps the pad and the ESD current occurred accordingly is desired to be discharged to the ground power terminal, a RC constant is maintained based on the first resistor, a first parasitic capacitor between the gate terminal and the drain terminal of the first NMOS transistor, and a second parasitic capacitor between the gate terminal and the drain terminal of the second NMOS transistor for the substrate-triggered effect of the ESD protection circuit.

17. The integrated circuit as claimed in claim 16, wherein when the ESD voltage zaps the pad, the bulk terminal of the second NMOS transistor is biased at a substrate-biasing voltage generated by the second resistor, with the substrate-biasing voltage, a parasitic lateral bipolar junction transistor effecting in the second NMOS transistor are triggered on to discharge the ESD current to the ground power terminal.

18. The integrated circuit as claimed in claim 16, wherein the substrate-triggered ESD protection circuit further comprising a second ESD portion, wherein the second ESD portion is used to charge an ESD current to an operation power terminal, wherein the second ESD portion comprises a third resistor, a fourth resistor, a first PMOS transistor and a second PMOS transistor, wherein a gate terminal of the first PMOS transistor is connected to the operation power terminal through a third resistor, a source terminal of the first PMOS transistor is connected to the operation power terminal through a fourth resistor and a drain terminal of the first PMOS transistor is connected to the pad, a bulk terminal of the first PMOS transistor is connected to the operation power terminal, the first PMOS is configured for being served as a substrate-biasing circuit without a capacitor formed between the gate terminal and the drain terminal thereof;

a gate terminal of the second PMOS transistor is connected to the gate terminal of the first PMOS transistor, and is also connected to the operation power terminal through the third resistor, a drain terminal of the second PMOS transistor is connected to the pad and a source terminal of the second PMOS transistor is connected to the operation power terminal, a bulk terminal of the second PMOS transistor is connected to the source terminal of the first PMOS transistor and is also connected to the operation power terminal through a fourth resistor, the second PMOS is configured for being served as an ESD protection element;

when a ESD voltage zaps the pad and the ESD current occurred accordingly is desired to be charged to the operation power terminal, a RC constant is maintained based on the third resistor, a first parasitic capacitor between the gate terminal and the drain terminal of the first PMOS transistor, and a second parasitic capacitor between the gate terminal and the drain terminal of the second PMOS transistor for the substrate-triggered effect of the ESD protection circuit.

19. The integrated circuit as claimed in claim 18, wherein when the ESD voltage zaps the pad, the bulk terminal of the second PMOS transistor is biased at a well-biasing voltage generated by the fourth resistor, with the well-biasing voltage, a parasitic lateral bipolar junction transistor effecting in the second PMOS transistor are triggered on to charge the ESD current to the operation power terminal.

* * * * *